(12) United States Patent
Fischer et al.

(10) Patent No.: US 10,745,133 B2
(45) Date of Patent: Aug. 18, 2020

(54) CARGO DRIVE UNIT WITH ACQUISITION OF A LOAD MOVEMENT

(71) Applicant: Airbus Operations GmbH, Hamburg (DE)

(72) Inventors: Dennis Fischer, Hamburg (DE); Oliver Nuessen, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 247 days.

(21) Appl. No.: 15/719,017

(22) Filed: Sep. 28, 2017

(65) Prior Publication Data

US 2018/0111688 A1   Apr. 26, 2018

(30) Foreign Application Priority Data

Oct. 20, 2016   (EP) .................................... 16194740

(51) Int. Cl.
| | |
|---|---|
| *B64D 9/00* | (2006.01) |
| *B60P 7/13* | (2006.01) |
| *B64C 1/20* | (2006.01) |
| *B65G 13/06* | (2006.01) |
| *B65G 13/02* | (2006.01) |
| *B65G 19/18* | (2006.01) |

(52) U.S. Cl.
CPC ................. *B64D 9/00* (2013.01); *B60P 7/13* (2013.01); *B64C 1/20* (2013.01); *B65G 13/02* (2013.01); *B65G 13/06* (2013.01); *B65G 19/185* (2013.01); *B64D 2009/006* (2013.01)

(58) Field of Classification Search
CPC .... B64D 9/00; B64D 2009/006; B65G 13/02; B65G 19/185; B65G 13/06; B60P 7/13; B64C 1/20
See application file for complete search history.

(56) References Cited

U.S. PATENT DOCUMENTS

| 7,198,227 | B2* | 4/2007 | Olin ......................... B64D 9/00 244/118.1 |
| 10,005,564 | B1* | 6/2018 | Bhatia ..................... B64D 45/00 |

(Continued)

FOREIGN PATENT DOCUMENTS

| EP | 0881144 A1 | 2/1998 |
| EP | 0937643 A2 | 8/1999 |

(Continued)

OTHER PUBLICATIONS

European Search Report for Application No. 16194740.3 dated Apr. 10, 2017.

*Primary Examiner* — Valentina Xavier
(74) *Attorney, Agent, or Firm* — Jenkins, Wilson, Taylor & Hunt, P.A.

(57) ABSTRACT

Disclosed here is a cargo drive unit for a cargo hold of an aircraft. The cargo drive unit includes at least one driven power transmission element, which is configured to transmit drive forces to a load arranged in the cargo hold, in order to move the load inside the cargo hold. The cargo drive unit also includes a sensor unit configured to acquire at least one movement parameter of the load. The cargo drive unit also includes a control unit configured to control the power transmission element according to the acquired movement parameter. Also disclosed here is a cargo hold that includes such a cargo drive unit, and a related method for operating such a cargo hold.

17 Claims, 1 Drawing Sheet

(56) References Cited

U.S. PATENT DOCUMENTS

2015/0225082 A1\* 8/2015 Levron .................... B64D 9/00
            244/137.1
2015/0298808 A1\* 10/2015 Huber .................... G01C 21/00
            701/25

FOREIGN PATENT DOCUMENTS

| EP | 1 346 911 A1 | 9/2003 |
| EP | 1 695 908 A2 | 8/2006 |
| EP | 2 444 320 A2 | 4/2012 |
| EP | 2813429 A1 | 12/2014 |
| WO | 0128884 A1 | 4/2001 |
| WO | WO 01/28894 A1 | 4/2001 |

\* cited by examiner

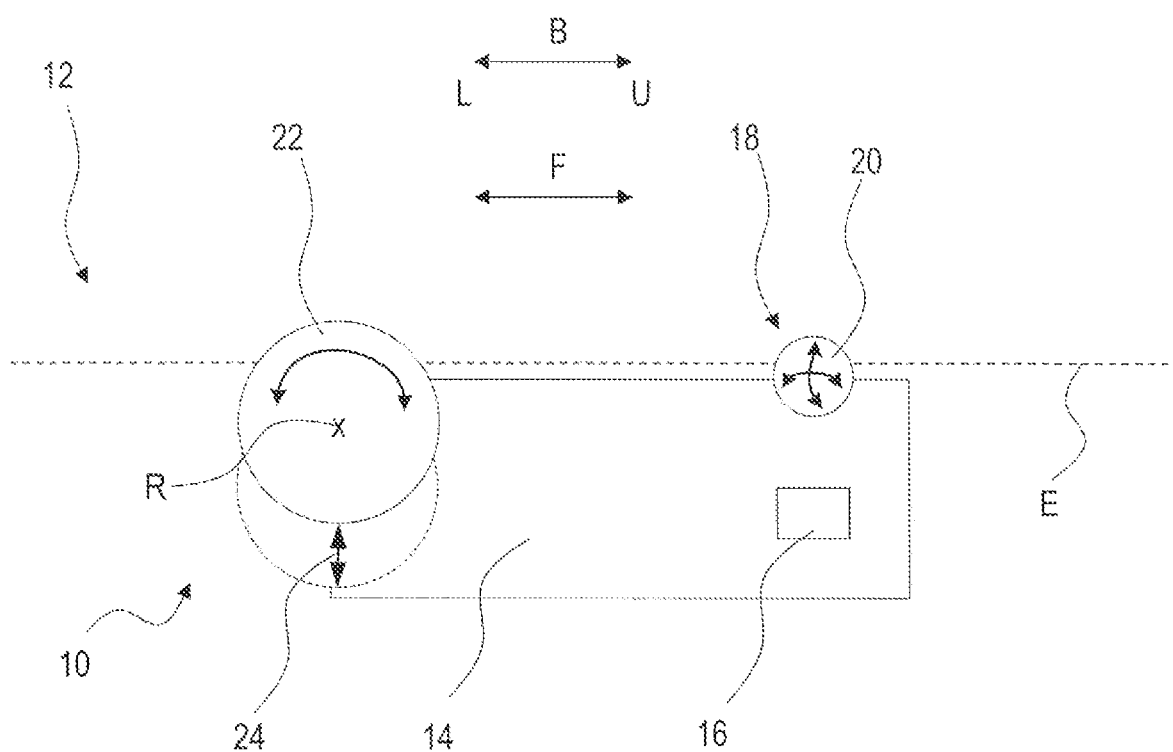

CARGO DRIVE UNIT WITH ACQUISITION OF A LOAD MOVEMENT

CROSS-REFERENCE TO PRIORITY APPLICATION

This application claims the benefit of, and priority to, European patent application number 16194740.3, filed Oct. 20, 2016. The content of the priority application is incorporated by reference herein.

TECHNICAL FIELD

Embodiments of the invention relate to a cargo drive unit for a cargo hold, in particular for the cargo hold of an aircraft, as well as a cargo hold and a method for operating a cargo hold.

BACKGROUND

In cargo holds of aircraft, it is known that loads, for example in the form of standardized pallets or containers (so-called unit load devices, ULD) can be loaded and unloaded via one or more cargo doors. When loading a cargo hold, however, the loads must often be transported away from the cargo door and into remote areas of the cargo hold. Conversely the loads must be transported back to the cargo door again when unloading the cargo hold. This can be assisted by cargo drive units, which are usually floor-mounted and fixed in position, and comprise driven rollers (so-called roller drive units or power drive units, PDU).

Conventional cargo holds comprise a plurality of such cargo drive units. As part of a loading process, a load can interact with several cargo drive units and be moved at least in sections from one cargo drive unit to the next, in order to achieve a continuous movement of the load inside the cargo hold. Reference is made here as an example to the European patent documents EP 2 813 429 A1 and EP 0 881 144 B1.

Coordinated control of the cargo drive units to achieve a desired load movement is currently accomplished by means of separate operating elements, such as joysticks or switches, for example, which have to be operated manually. However, the provision of such operating elements entails a corresponding configuration outlay and increases the complexity of the system.

BRIEF SUMMARY

A cargo drive unit for a cargo hold, in particular for the cargo hold of an aircraft, is provided here. The cargo drive unit includes at least one driven power transmission element, which is formed to transmit drive forces to a load arranged in the cargo hold, in order to move the load inside the cargo hold. The cargo drive unit also includes a sensor unit, which is formed to acquire at least one movement parameter of the load, and a control unit, which is formed to control the power transmission element according to the acquired movement parameter.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following FIGURES, wherein like reference numbers refer to similar elements throughout the FIGURES.

FIG. 1 shows a cargo drive unit according to an exemplary embodiment of the invention.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This disclosure presents a solution that facilitates a reliable movement of loads with limited system complexity.

To this end a cargo drive unit for a cargo hold is provided, in particular for the cargo hold of an aircraft (for example, of a plane). The cargo drive unit comprises at least one driven power transmission element, which is formed to transmit drive forces to a load arranged in the cargo hold, in order to move the load inside the cargo hold. The cargo drive unit may be provided generally as a separately manageable assembly. It may further be connected to connection lines of the cargo hold, for example to power supply lines as well as communications, signal or data lines. The cargo drive unit may further be formed to move loads along at least one predetermined movement axis, and to be precise, preferably in both directions along this axis. In this case the cargo drive unit and in particular its power transmission element may be variably controllable even for taking up predetermined movement axes, so that an orientation of the power transmission element can be varied according to the desired movement axis, for example. However, it may also be provided that the cargo drive unit and in particular its power transmission element are arranged with a predetermined and substantially fixed orientation in the cargo hold, in order to produce a load movement only along predetermined and non-variable movement axes and in particular along only one movement axis.

The cargo drive unit may be arranged in a known manner close to a cargo door of the aircraft so that a load movement transverse to a longitudinal axis of the cargo hold or of the aircraft is facilitated. In other words, the movement axis of the cargo drive unit may extend transversely to a fuselage opening defined by the cargo door. Likewise, the cargo drive unit may allow load movement along a longitudinal axis of the cargo hold or of the aircraft, thus substantially parallel to a fuselage opening defined by the cargo door.

To transmit drive forces, the power transmission element may be formed to be supported at least indirectly on the load and in particular to come into contact with it. The contact can be positive and/or frictional. The power transmission element may further be generally movable, slidable, rotatable or the like to transmit drive forces to the load. The drive forces may be produced by an electric motor.

The cargo drive unit further comprises a sensor unit, which is formed to acquire at least one movement parameter of the load. The movement parameter may relate to a movement of the load relative to the normally fixed cargo drive unit and in particular its power transmission element. The sensor unit may generally be formed for a visual, tactile, capacitive and/or inductive acquisition of the load movement or of the movement parameter. In particular, the sensor unit may be integrated directly in the assembly formed by the cargo drive unit. On a higher level the sensor unit may thus be formed to acquire a suitable process, which permits a conclusion about a possible load movement and in particular about the desired movement parameter. The sensor unit may further produce corresponding signals, which permit a conclusion about the movement parameter, and convey these to a control unit of the cargo drive unit that is explained below.

The cargo drive unit further comprises a control unit, which is formed to control the power transmission element according to the movement parameter acquired. For example, an operating state of the power transmission element may be changed according to the movement parameter acquired. This may include a switching on and/or off of the power transmission element, in particular related to the production of drive forces. This may likewise include a change in the drive forces produced by the power transmission element. The control unit may be connected to the sensor unit for this and receive signals with reference to the movement parameter acquired from the sensor unit. Based on this, control signals may then be produced for the power transmission element. It is further understood that the control unit may also be formed for an adjustment of the power transmission element, thus, for example, adherence to the control instructions by the power transmission element can be monitored and the control instructions adapted on the basis of any deviations (feedback control). It should be pointed out that, unless otherwise specified, the term "control" in the context of the present disclosure may generally also always comprise an optional adjustment.

Using this solution it can be made possible for an operator, by moving a load into a working area of the cargo drive unit, to initiate a sensor acquisition of the corresponding load movement and thus also automatically an activation of the power transmission element. In contrast to known solutions, no other manual inputs or at least fewer other manual inputs may be necessary for this. In particular, additional operating elements can be designed to be less complex or can even be eliminated completely. In other words, the solution according to an embodiment of the invention can enable drive forces to be switched on, varied and/or switched off automatically as a function of the load movement acquired.

When moving a load through the cargo hold, furthermore, drive forces can be switched on only locally or section by section to support the movement by electric motor. This can be carried out by only the cargo drive units that are arranged in direct proximity to the load and acquire its movement by sensor accordingly. Cargo drive units arranged further away, on the other hand, can be put into a resting state, in which they do not produce any drive forces. This can facilitate a particularly demand-oriented production of drive forces, due to which the energy requirement and in particular the power requirement can also be reduced during the loading and unloading of a cargo hold.

According to a further development, the cargo drive unit may be arrangeable in a floor area of the cargo hold. When formed as a separately manageable assembly, the cargo drive unit can thus be arranged in recesses, frames, floor panels or the like in a cargo hold floor. In this case at least the power transmission element may be formed to protrude optionally above the floor area so that it can come into contact with a load arranged in the cargo hold in order to move this along the floor area.

Alternatively or in addition, the power transmission element may be formed roll-shaped or as a roller. The roller may rotate about a fixed or variable axis of rotation and transmit drive forces to a load, which forces may extend transversely and in particular orthogonally to the axis of rotation. The term roller can be understood generally in this case as wheels, discs, cylinders or the like rotatable about an axis of rotation.

The movement parameter acquired may comprise a movement speed of the load, in particular relative to or with regard to the normally fixed cargo drive unit and/or its power transmission element. In addition or alternatively, the movement parameter may comprise a movement direction of the load, in particular relative to and/or with regard to the power transmission element. The term "with regard to" can be understood in this case to mean that the relative component serves as a fixed point of reference and that the movement is defined in relation to this point of reference.

In other words, the movement parameter can thus indicate or permit conclusions as to whether the load is being moved towards the cargo drive unit or away from it, or in which direction along a predetermined movement axis a load movement takes place.

The control unit may be formed to control the power transmission element to produce predetermined drive forces, in particular so that the drive forces are produced at least in part substantially proportional to the acquired movement parameter. This may relate to the production of drive forces with a predetermined value, progression or a predetermined change (for example, a predetermined increase or decrease). For example, it may be provided that the drive forces are increased when an increasing movement speed of the load is detected and/or are reduced when a movement speed decreases, wherein the corresponding changes can take place proportionally. This may also be provided only for a specified movement parameter range (thus only in part or in areas), whereas in the event of predetermined threshold values being exceeded, non-proportional changes in the drive forces can take place, in particular they can be switched off completely.

On a higher level it may also be provided that the control unit controls the drive forces so that a specified target speed of the load is reached or at least not exceeded.

According to one variant, the power transmission element may be formed to produce at least such drive forces that a load movement speed acquired by sensor can be maintained without further manual support or, expressed another way, the load movement is substantially taken over completely. In this case an operator can concentrate on monitoring the load movement, such as the adherence to a specified orientation, whereas the load movement or drive forces can be applied substantially completely by the cargo drive unit. It is generally understood that even several cargo drive units can produce drive forces at the same time and apply them to a load. It can thus also be sufficient in principle if a cargo drive unit only produces drive forces so that at least half or a quarter of an acquired load movement speed can be maintained. On a higher level, the load movement speed may be between 0 m/s and 1 m/s here, wherein the loads may generally have a total weight of up to 2 t, up to 4 t, up to 6 t, up to 10 t, or up to 15 t.

The control unit may further be formed to control the power transmission element to produce drive forces in predetermined directions, in particular so that the drive forces are substantially produced in the direction in which a movement of the load takes place relative to the power transmission element. As explained above, the movement parameter can indicate, for example, whether a load is being moved towards the cargo drive unit or away from it, or in which direction the load is moved along a specified movement axis. The drive forces can accordingly also be produced so that they support the continued movement of the load, thus act substantially in the same direction.

A further development provides that the control unit is formed to receive signals from at least one other cargo drive unit and/or to transmit them to at least one other cargo drive unit. The cargo drive unit may thus be capable of being networked for a data or signal exchange with other cargo drive units, for example by connection to a common communications bus. The signals may contain information with regard to the acquired movement parameter and/or with regard to the drive forces produced. In addition or alternatively, the signals may permit conclusions generally as to whether the cargo drive unit is currently moving a load or could move a load, as a load is arranged in a working area of the cargo drive unit. Such information is described below also as a load movement state of a cargo drive unit.

The other cargo drive unit may in particular be a cargo drive unit that is arranged along a common movement axis. As explained in the introduction, a plurality of cargo drive units may be arranged so that they can move a load along a common movement axis (e.g. along the longitudinal axis of the aircraft), wherein the load is handed over, so to speak, from one cargo drive unit to the next. The other cargo drive unit may be directly up- and/or downstream when viewed along the movement axis. An approach of a load to be moved can thus be detected in advance and the control unit can prepare the cargo drive unit for the upcoming movement of this load and interrupt a resting state, for example.

The control unit may further be formed to control the power transmission element according to a signal received from at least one other cargo drive unit, in particular wherein the signal received may comprise information with regard to the movement parameter acquired by the other cargo drive unit. As explained above, the power transmission element can thus be switched on or off selectively by the control unit and/or the drive forces produced by this can be varied in a desired manner, to be precise as a function of the movement parameter of the other cargo drive unit.

In general, it may further be provided that the control unit is formed to change an operating state of the cargo drive unit if the signal received permits the conclusion that the load is being moved in the direction of the cargo drive unit by the other cargo drive unit.

The cargo drive unit may further comprise a positioning unit, which is formed to move the power transmission element in the direction of the load and/or away from it, and in particular, wherein the control unit is formed to control the positioning unit according to the acquired movement parameter and/or a signal received from another cargo drive unit. The positioning unit may be activatable in a known manner to bring the power transmission element into contact with a load for the transmission of drive forces and/or, if no such transmission is desired, to release it from the load. In the latter case, it may further be provided that the power transmission element can be arranged underneath a floor area, thus sunk inside the cargo drive unit, so to speak, so that it does not protrude as a disruptive contour into the cargo hold. The positioning unit may comprise a motor drive (for example, an electric motor), which may be provided to produce drive forces independently of a drive unit of the power transmission element.

The positioning unit may further move the power transmission element selectively according to at least one of the above movement types relative to the load, thus raise or lower it selectively, for example. This can take place according to the movement parameter, for example if this indicates that a load movement was acquired by sensor (raise) or that a load movement is no longer taking place (lower). Such movements can likewise take place by way of the positioning unit if another cargo drive unit (and in particular a cargo drive unit directly up- or downstream along a common movement axis) transmits signals with regard to a commencing or concluded load movement. In this case a raising of the power transmission element can take place in particular in preparation for an imminent load movement.

According to another aspect, the control unit may be formed to determine a power consumption of the cargo drive unit and, optionally, to control the power transmission element according to the power consumption determined. The control unit may comprise or be connected to a corresponding power consumption sensor for this. The power consumption may indicate a loading of the cargo drive unit in a known manner, thus the force with which a load is moved relative to this, for example. The power consumption can pertain here to the power transmission element in particular and, put more precisely, the power consumption taking place in connection with the production of drive forces. If this rises unexpectedly strongly, this can mean, for example, that a permitted threshold value of the load speed is exceeded, whereupon the control unit can reduce the drive forces produced by the power transmission element. An unexpected decline in the power consumption, on the other hand, can mean that a target speed of the load is not reached, whereupon the drive forces can be increased accordingly.

The cargo drive unit may further be formed to move a load substantially along at least one movement axis, wherein, optionally, the sensor unit and the power transmission element may further be arranged substantially on the movement axis or on a common axis parallel to this. The movement axis may be one of the variants named above, thus a movement axis along the longitudinal axis of the aircraft or transverse to this, for example. The sensor unit and the power transmission element may thus be arranged substantially behind one another along the movement axis (or along a common axis, which is parallel to this). The sensor unit can determine a load movement relative to the cargo drive unit reliably due to this.

The sensor unit may be arranged at a distance of less than 1 meter and preferably of less than 30 cm or less than 10 cm from the power transmission element. This can contribute to the compactness of the cargo drive unit on the one hand, but also improve the reliability of the movement determination.

The sensor unit may further comprise a movable element, which is movable according to the movements of the load. This may be a roller, a ball or similar. The movable element may further be movable omnidirectionally in general, in order to be able to yield to all load movements. The movable element may further be formed to come into contact with the load, thus to facilitate a tactile acquisition of the load movement. To this end the movable element may be configured to project permanently or at least selectively above the floor area of the cargo hold.

The sensor unit may further be formed to acquire the movement parameter of the load based on the movements of the movable element. Expressed another way, the sensor unit may produce signals based on the movements of the movable element, which signals permit conclusions about a movement parameter of the load. These signals may be processed further by the sensor unit itself or by the control unit of the cargo drive unit. A detection of the load movement may generally take place in at least one direction. In particular, it may be provided that the sensor unit is formed to undertake at least one acquisition of the movement parameter in both directions along a predetermined movement axis. This may involve any of the variants of the movement axis discussed above, thus in particular an axis along which the drive forces are produced.

An embodiment of the invention further relates to a cargo hold, in particular of an aircraft (of a plane, for example), comprising at least one cargo drive unit according to one of the above aspects. As discussed at the beginning, the cargo hold may also comprise a plurality of such cargo drive units, which may further be arranged in order to facilitate jointly and/or consecutively a load movement along a predetermined movement axis. In particular, a first group of cargo drive units can facilitate a movement transverse to a longitudinal axis of the cargo hold (for example, in the area of a cargo door) and a second group of cargo drive units can facilitate a movement along the longitudinal axis of the cargo hold into areas remote from the cargo door. The respective groups can thus define common movement axes, along which they are arranged and along which drive forces can be produced. The cargo drive units may further exchange signals in the manner described above, at least within these particular groups, so as to operate in a demand-oriented manner only those cargo drive units that are directly or immediately imminently involved in a load movement.

An embodiment of the invention further relates to a method for operating a cargo hold, wherein the cargo hold comprises at least a first and a second cargo drive unit, which each comprise at least one driven power transmission element, which is formed to transmit drive forces to a load arranged in the cargo hold, in order to move the load inside the cargo hold, wherein the method comprises the steps: acquisition of a load movement state of the first cargo drive unit; and control of the second cargo drive unit according to the load movement state of the first cargo drive unit.

The method may further comprise any other step to provide the aforesaid effects and/or operating states of the cargo drive unit or of the cargo hold. The cargo drive unit may likewise be developed further according to any of the aforesaid aspects. The load movement state may further comprise the movement parameter or be derived or formed from this. Furthermore, the load movement state may permit conclusions as to whether the cargo drive unit is currently moving a load or could move it (for example, as a load is arranged in a working area of the cargo drive unit). The method may additionally include the step of transmitting signals with regard to the load movement state of the first cargo drive unit to the second cargo drive unit. Furthermore, the control of the second cargo drive unit may include a switching on or off of the cargo drive unit or of a power transmission element or of a positioning unit of this. Alternatively or in addition, this may also include the changing of the drive forces produced. Finally, the first and second cargo drive unit may be arranged consecutively along a common movement axis.

On a higher level, it may also be provided that a first and second cargo drive unit are provided consecutively along a common movement axis, wherein in the event of a load movement in a first direction along the movement axis, the second cargo drive unit then assumes or increases the production of drive forces if the load movement state of the first cargo drive unit indicates the presence and/or the movement of a load. Likewise, in the case of a load movement in a second direction, the first cargo drive unit may then assume or increase the production of drive forces if the load movement state of the second cargo drive unit indicates the presence and/or the movement of a load. It is understood that the first direction can be selected here so that the load is first moved through the working area of the first cargo drive unit, whereas in the second direction the working area of the second cargo drive unit is crossed first.

An embodiment of the invention is explained below with reference to the enclosed schematic FIG. 1, which shows an exemplary embodiment of a cargo drive unit according to the invention.

FIG. 1 shows a schematic side view of a cargo drive unit 10. The plane E indicated by a dashed line gives the height level of a floor area of a cargo hold 12, in which the cargo drive unit 10 is arranged. The cargo hold is the cargo hold of a conventional wide-bodied aircraft. A longitudinal aircraft axis F extends here along the progression of the plane E indicated by the dashed line.

The cargo drive unit 10 comprises a basic body 14, in which a control unit 16 is taken up. Arranged on the basic body 14 is a sensor unit 18 with an omnidirectionally rotatable ball 20 (see corresponding movement arrows of the ball 20 in FIG. 1). The ball 20 forms a movable element of the sensor unit 18, which projects permanently above the floor area into the cargo hold 12. The ball 20 can thus come into contact with a load (not shown) that is displaceable along the floor area and can be rotated according to a movement of the load relative to the cargo drive unit 10.

In the case shown, the sensor unit 18 is formed to acquire load movements along a movement axis B, which coincides with the longitudinal aircraft axis F. As a whole the sensor unit 18 can thus be traveled over omnidirectionally by a load, but only acquires the load movements bidirectionally along the movement axis B. Since the cargo drive unit 10 is mounted in a fixed location close to the floor area of the cargo hold 12, the movement direction acquired also represents a relative movement direction of the load with regard to the fixed cargo drive unit 10.

The cargo drive unit 10 further comprises a power transmission element 22 in the form of a drive roller. The drive roller 22 is formed to rotate about an axis of rotation R standing perpendicular on the sheet plane (see corresponding movement arrow of the drive roller 22 in FIG. 1). Drive forces are produced by the rotation of the drive roller 22, which forces are transmissible to a load (not shown) arranged above the cargo drive unit 10. The drive forces act in this case likewise along the movement axis B. In particular, for loading of the cargo hold 12, drive forces can be produced in the first direction L along the movement axis B and for unloading in the opposed second direction U of the movement axis B. For this a rotation direction of the drive roller 22 can be reversed accordingly.

In FIG. 1, it is recognized finally that the drive roller 22 can be moved substantially orthogonally to the floor area of the cargo hold 12 by a positioning unit 24 indicated by an arrow. Put more precisely, the drive roller 22 can be moved in the direction of the load arranged on the floor area or moved away from this, thus selectively raised and lowered.

The position indicated by a dashed line in FIG. 1 corresponds here to a lowered position, in which the drive roller 22 does not project above the floor area and thus cannot transmit any drive forces to any load arranged thereon. However, in FIG. 1 the drive roller 22 takes up its raised position, in which it projects above the floor area and can thus come into contact with a load, in order to transmit drive forces to it. Such positioning units 24 are known in principle from the prior art.

When loading or unloading the cargo hold 12, an operator first pushes a load manually or with the support of loading devices external to the aircraft along the floor area. When he reaches the sensor unit 18 of the cargo drive unit 10 here, both the movement speed and the movement direction L, U along the movement axis B are acquired by the sensor unit 18 as relevant movement parameters. The corresponding signals are then transmitted by the sensor unit 18 to the control unit 16. This controls the drive roller 22 in turn to produce drive forces in the movement direction L, U acquired accordingly. This is realized in a conventional manner by an electric motor. The drive forces can further be selected so that the current movement speed is maintained or a specified target speed is reached. It can also be taken into account here that other cargo drive units 10 (offset, for example, into the sheet plane) likewise transmit drive forces to the load parallel to this.

However, if the sensor unit 18 no longer displays a load movement, the active rotation of the drive roller 22 is suppressed. The drive roller 22 is also lowered via the positioning unit 24 to reduce disruptive contours in the cargo hold 12. This can make it easier to rotate the load, for example, or to change from a movement along the movement axis B to a movement running transversely to this (or vice-versa) in the area of a cargo door.

During loading according to the direction L, the load specifically first reaches the sensor unit 18, whereupon the drive roller 22 can be activated in the manner described above. When unloading according to the direction U, on the other hand, the load first reaches the drive roller 22, which first rotates passively and follows the movement of the load. On reaching the sensor unit 18, however, the load movement is detected and the drive roller 22 is actively controlled and rotates to produce drive forces. It is generally also conceivable, however, to provide a second sensor unit or any number of sensor units 18, which are connected upstream of the drive roller 22 in the unloading direction U also.

The cargo drive unit 10 explained above thus facilitates demand-oriented motorized support of the load movement in the cargo hold 12 without any separate inputs of the operator being required for this. On the contrary, it is sufficient to move the load over the sensor unit 18, whereupon the production of drive forces in the desired direction and in a desired amount commences automatically. In other words, the cargo drive unit 10 permits an automatic takeover of the load, so that additional operating elements can be avoided and the system complexity can therefore be reduced. The energy requirement of the overall system is also reduced by such demand-oriented load takeover.

The cargo hold 12 may further comprise in a known manner a plurality of cargo drive units 10, which are arranged along the movement axis B. In this case the control units 16 of the cargo drive units 10 can exchange signals with one another, in order to control the motorized support of the load movement reliably and in a demand-oriented manner. For example, during loading another cargo drive unit 10, which is connected directly upstream of the cargo drive unit 10 from FIG. 1 in the loading direction L, can transmit a signal as soon as it detects a load movement and/or produces drive forces. In this case the control unit 16 of the downstream cargo drive unit 10 shown can activate the positioning unit 24, in order to raise the drive roller 22 into the position shown in FIG. 1. The information about whether, in which direction and/or at what speed a load is being transported can be communicated by a cargo drive unit 10 respectively to other cargo drive units 10 located at least directly up- and/or downstream.

The cargo drive unit 10 may further be arranged in a known manner close to a locking device for the load, which device is not shown and can be formed as a selectively configurable and lowerable so-called latching unit. The control unit 16 of the cargo drive unit 10 may further be formed to receive signals with regard to a current locking state of the locking device. If these indicate an active locking, the control unit 16 can cause the cargo drive unit 10 to move the drive roller 22 into its lowered position and/or to put the cargo drive unit 10 generally into a resting state, in which in particular no drive force production takes place. In the same sense, however, the control unit 10 can initiate a raising of the drive roller 22 and/or terminate the resting state of the cargo drive unit if unlocking by the locking device is detected. The drive roller 22 can then be driven at the latest for the production of drive forces if, as described above, a load movement is detected by the sensor unit 18.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A cargo drive unit for a cargo hold, in particular for the cargo hold of an aircraft, the cargo drive unit comprising:
    at least one driven power transmission element configured to transmit drive forces to a load arranged in the cargo hold to move the load inside the cargo hold along at least one predetermined movement axis;
    a sensor unit configured to be traveled over omnidirectionally by the load and to acquire at least one movement parameter of the load bidirectionally along the movement axis; and
    a control unit configured to control the power transmission element according to the acquired movement parameter.

2. The cargo drive unit according to claim 1, wherein the cargo drive unit is arrangeable in a floor area of the cargo hold.

3. The cargo drive unit according to claim 1, wherein the power transmission element is formed roll-shaped.

4. The cargo drive unit according to claim 1, wherein the acquired movement parameter comprises a movement direction of the load, in particular relative to the power transmission element.

5. The cargo drive unit according to claim 1, wherein the control unit is configured to control the power transmission element to produce predetermined drive forces, such that the drive forces are produced at least in part substantially proportional to the acquired movement parameter.

6. The cargo drive unit according to claim 1, wherein the control unit is configured to control the power transmission element to produce drive forces in predetermined directions, such that the drive forces are produced substantially in the direction in which a movement of the load takes place relative to the power transmission element.

7. The cargo drive unit according to claim 1, wherein the control unit is configured to receive signals from at least one other cargo drive unit.

8. The cargo drive unit according to claim 1, wherein the control unit is configured to transmit signals to at least one other cargo drive unit.

9. The cargo drive unit according to claim 7, wherein the control unit is configured to control the power transmission element according to the signal received, wherein the received signal comprises information with regard to the movement parameter acquired by the other cargo drive unit.

10. The cargo drive unit according to claim 7, wherein the control unit is configured to change an operating state of the cargo drive unit if the signal received permits the conclusion that the load is being moved in the direction of the cargo drive unit by the other cargo drive unit.

11. The cargo drive unit according to claim 1, wherein the cargo drive unit further comprises a positioning unit configured to move the power transmission element in the direction of the load and/or away from the load, and wherein the control unit is configured to control the positioning unit according to at least one of the acquired movement parameter and a signal received from at least one other cargo drive unit.

12. The cargo drive unit according to claim 1, wherein the control unit is configured to determine a power take-up of the cargo drive unit and to control the power transmission element according to the power take-up determined.

13. The cargo drive unit according to claim 1, wherein the sensor unit and the power transmission element are arranged substantially on the movement axis or on a common axis parallel to the movement axis.

14. The cargo drive unit according to claim 1, wherein the sensor unit is arranged at a distance of less than 1 meter and preferably less than 30 cm or less than 10 cm from the power transmission element.

15. The cargo drive unit according to claim 1, wherein the sensor unit comprises a movable element, which is movable according to the movements of the load, and wherein the sensor unit is configured to acquire the movement parameter of the load based on the movements of the movable element.

16. A cargo hold for an aircraft, the cargo hold having at least one cargo drive unit, each cargo drive unit comprising:
at least one driven power transmission element configured to transmit drive forces to a load arranged in the cargo hold to move the load inside the cargo hold along at least one predetermined movement axis;
a sensor unit configured to be traveled over omnidirectionally by the load and to acquire at least one movement parameter of the load bidirectionally along the movement axis; and
a control unit configured to control the power transmission element according to the acquired movement parameter.

17. A method for operating a cargo hold comprising at least a first and a second cargo drive unit, which each comprise at least one driven power transmission element and a sensor unit, wherein the at least one driven power transmission element is configured to transmit drive forces to a load arranged in the cargo hold, in order to move the load inside the cargo hold along at least one predetermined movement axis, and wherein the sensor unit is configured to be traveled over omnidirectionally by the load and to acquire at least one movement parameter of the load bidirectionally along the movement axis, wherein the method comprises the steps of:
acquiring of a load movement state of the first cargo drive unit; and
controlling the second cargo drive unit according to the load movement state of the first cargo drive unit.

* * * * *